(12) United States Patent
Yang et al.

(10) Patent No.: US 9,360,936 B2
(45) Date of Patent: Jun. 7, 2016

(54) HEAD MOUNTED DISPLAY APPARATUS

(71) Applicant: Quanta Computer Inc., Tao Yuan Shien (TW)

(72) Inventors: Wen-Chu Yang, New Taipei (TW); Chung-Te Li, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 150 days.

(21) Appl. No.: 14/281,115

(22) Filed: May 19, 2014

(65) Prior Publication Data

US 2015/0241695 A1 Aug. 27, 2015

(30) Foreign Application Priority Data

Feb. 24, 2014 (TW) .............................. 103106000 A

(51) Int. Cl.
*G09B 5/00* (2006.01)
*G02B 27/14* (2006.01)
*G06F 3/01* (2006.01)
*G02B 27/01* (2006.01)
*G02B 27/00* (2006.01)

(52) U.S. Cl.
CPC .............. *G06F 3/013* (2013.01); *G02B 27/017* (2013.01); *G02B 27/0093* (2013.01); *G02B 2027/014* (2013.01); *G02B 2027/0123* (2013.01); *G02B 2027/0132* (2013.01); *G02B 2027/0138* (2013.01); *G02B 2027/0178* (2013.01); *G02B 2027/0187* (2013.01)

(58) Field of Classification Search
CPC ..................... G02B 2027/0178; G02B 27/017; G02B 27/0172; G02B 2027/014
See application file for complete search history.

(56) References Cited

U.S. PATENT DOCUMENTS

| | | | |
|---|---|---|---|
| 2009/0231722 A1* | 9/2009 | Filipovich et al. ............. | 359/631 |
| 2011/0228403 A1* | 9/2011 | Masuda et al. ................ | 359/630 |
| 2013/0077175 A1* | 3/2013 | Hotta et al. ................... | 359/630 |
| 2013/0176533 A1* | 7/2013 | Raffle et al. ................... | 351/209 |

FOREIGN PATENT DOCUMENTS

| | | |
|---|---|---|
| CN | 103033935 A | 4/2013 |
| TW | 201224516 A | 6/2012 |

* cited by examiner

*Primary Examiner* — Alexander Eisen
*Assistant Examiner* — Nan-Ying Yang
(74) *Attorney, Agent, or Firm* — Rabin & Berdo, P.C.

(57) ABSTRACT

A head mounted display (HMD) apparatus is disclosed. The HMD apparatus comprises a pico projector, a lens, a half reflective film, an application processor, and an eyeglass frame. The half reflective film covers the lens. The application processor controls the pico projector to project a virtual image beam to the half reflective film. The eyeglass frame carries the pico projector, the lens, and the application processor.

25 Claims, 17 Drawing Sheets

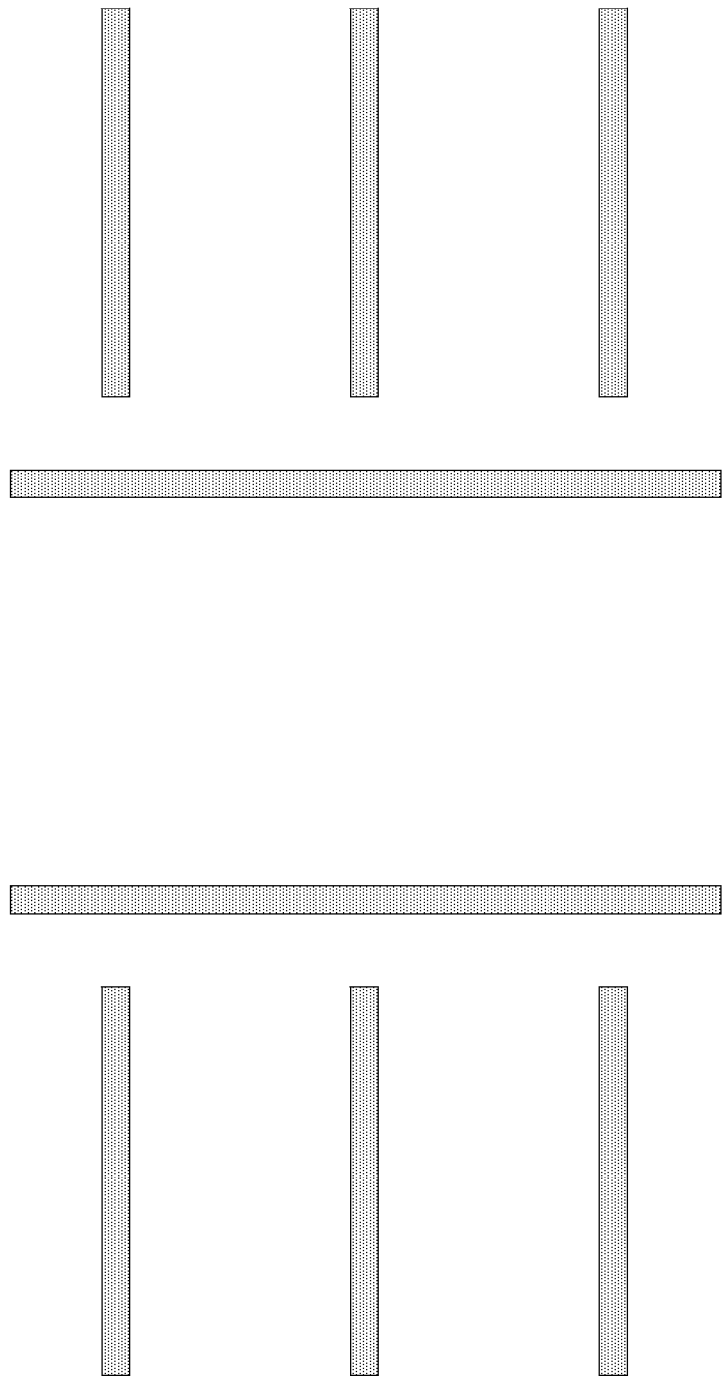

HEAD MOUNTED DISPLAY APPARATUS

This application claims the benefit of Taiwan application Serial No. 103106000, filed Feb. 24, 2014, the subject matter of which is incorporated herein by reference.

BACKGROUND OF THE INVENTION

1. Field of the Invention

The invention relates in general to an electronic apparatus, and more particularly to a head mounted display (HMD) apparatus.

2. Description of the Related Art

Along with the advance in technology, people assimilate more and more information every day. Commonly seen electronic apparatuses such as multimedia play apparatus, network communication apparatus and computer apparatus are equipped with a cathode ray tube (CRT) or a liquid crystal display (LCD) for displaying images. However, the pixels and size of a displayed image depend on the size and efficiency of the display, and a conventional CRT or LCD cannot meet the requirements of large size and convenient portability at the same time. To resolve the above problem, an optical see-through head mounted display (HMD) apparatus is provided. The head mounted display apparatus has a CRT or LCD disposed in front of each eye. The head mounted display apparatus projects the images outputted by respective CRT or LCD onto the user's retinas through beam splitters and creates a 3D effect by using the parallax between the user's two eyes.

In a conventional optical see-through HMD apparatus, a beam splitter is disposed in front of each eye and cannot be adjusted. Moreover, in order to achieve a certain viewing angle, the beam splitter of a conventional HMD apparatus must have a certain thickness because the beam splitter is a cube polarizing beam splitter (cube PBS). Thus, it becomes even more difficult for a conventional optical see-through HMD apparatus to reduce its volume.

SUMMARY OF THE INVENTION

The invention is directed to a head mounted display (HMD) apparatus.

According to one embodiment of the present invention, a head mounted display (HMD) apparatus is disclosed. The HMD apparatus comprises a pico projector, a lens, a half reflective film, an application processor, and an eyeglass frame. The half reflective film covers the lens. The application processor controls the pico projector to project a virtual image beam to the half reflective film. The eyeglass frame carries the pico projector, the lens and the application processor.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIGS. 10C ~10E and FIGS. 11C ~11E are schematic diagrams of results of the third 3D correction pattern viewed by a user.

DETAILED DESCRIPTION OF THE INVENTION

First Embodiment

Figure 1:
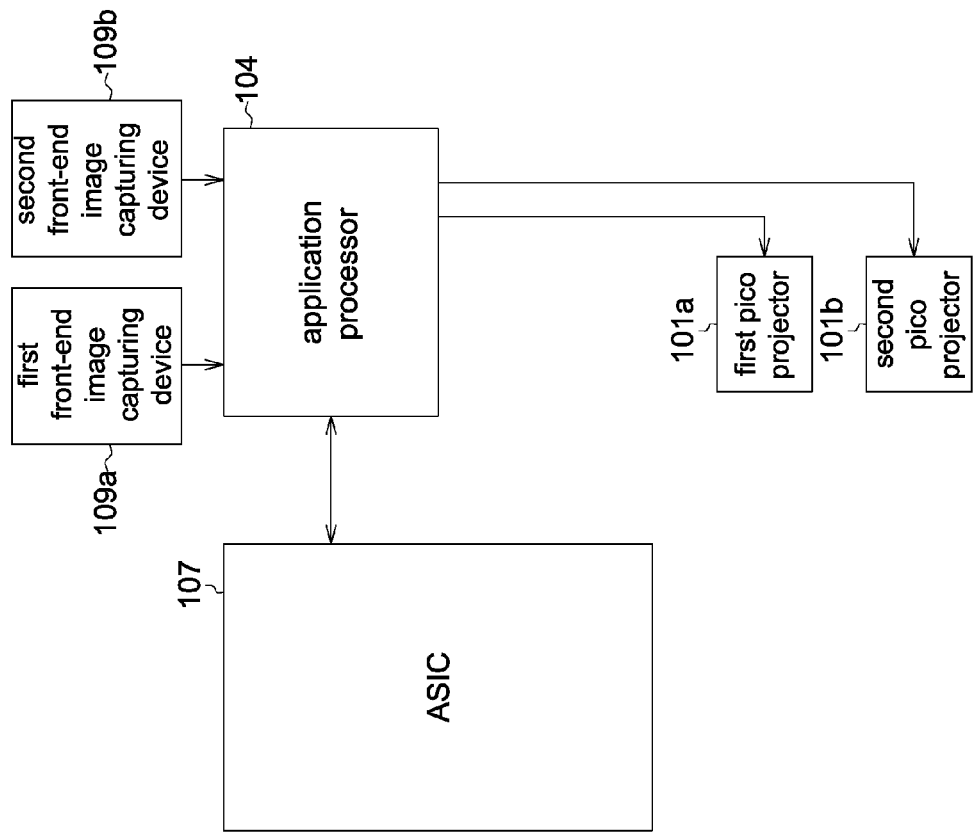
FIG. 1 is a block diagram of an HMD apparatus according to a first embodiment.
Figure 2:
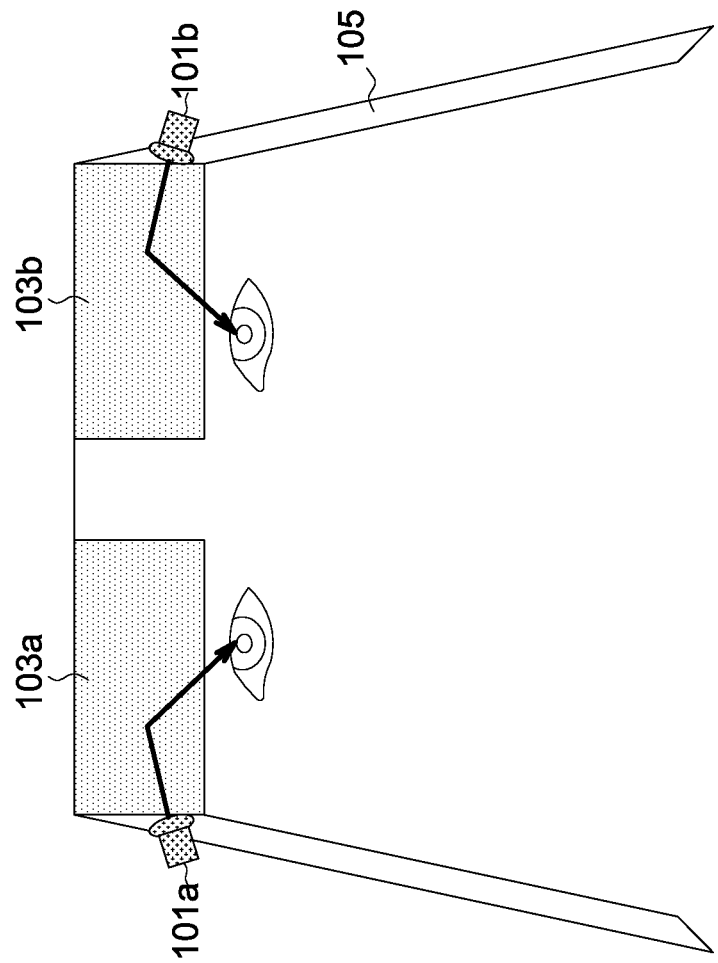
FIG. 2 is an appearance diagram of an HMD apparatus according to a first embodiment.
Figure 3:
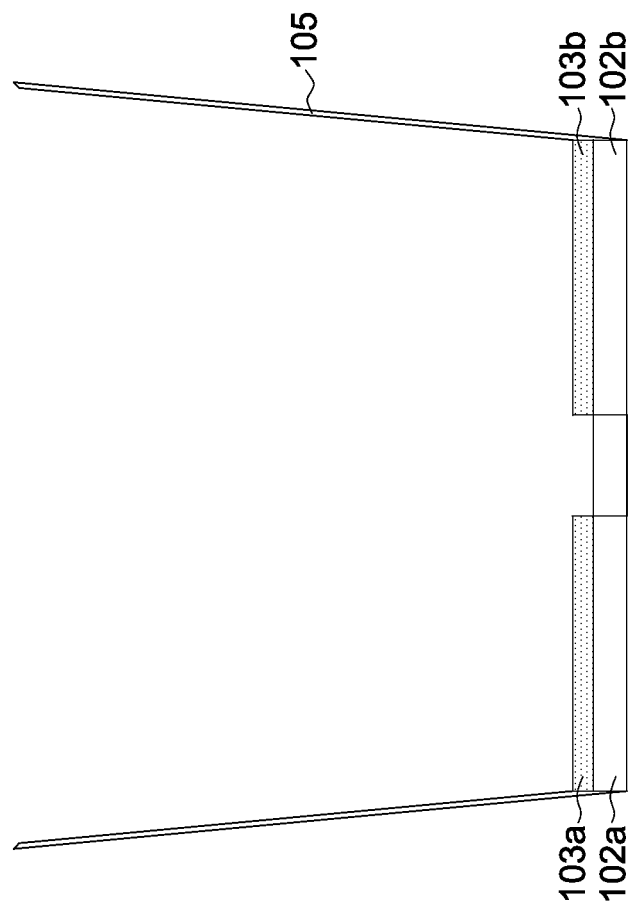
FIG. 3 is an upper view of an HMD apparatus according to a first embodiment.

Refer to FIG. 1, FIG. 2 and FIG. 3. FIG. 1 is a block diagram of an HMD apparatus according to a first embodiment. FIG. 2 is an appearance diagram of an HMD apparatus according to a first embodiment. FIG. 3 is an upper view of an HMD apparatus according to a first embodiment. The HMD apparatus 1 comprises a first pico projector 101*a*, a second pico projector 101*b*, a first lens 102*a*, a second lens 102*b*, a first half reflective film 103*a*, a second half reflective film 103*b*, an application processor 104, an eyeglass frame 105, an application specific integrated circuit (ASIC) 107, a first front-end image capturing device 109*a* and a second front-end image capturing device 109*b*. The ASIC 107 communicates with the application processor 104 through a universal serial bus (USB). The first front-end image capturing device 109*a* and the second front-end image capturing device 109*b* are connected to the application processor 104, and communicate with the application processor 104 through a mobile industry processor interface (MIPI).

The first half reflective film 103*a* covers the first lens 102*a*, and the second half reflective film 103*b* covers the second lens 102*b*. An incoming light can be reflected by or penetrate through the first half reflective film 103*a* and the second half reflective film 103*b*, and the reflection/penetration ratio of the incoming light depends on the product design and is adjustable. Therefore, the first half reflective film 103*a* and the second half reflective film 103*b* reflect the light of a virtual image but allow the external light of a physical image to penetrate through. The application processor 104 controls the first pico projector 101*a* and the second pico projector 101*b* to project a first virtual image beam and a second virtual image beam to the first half reflective film 103*a* and the second half reflective film 103*b*, respectively. The first front-end image capturing device 109*a* and the second front-end image capturing device 109*b* both capture a front-end image of the HMD apparatus 1. The eyeglass frame 105 carries the first pico projector 101*a*, the second pico projector 101*b*, the first lens 102*a*, the second lens 102*b*, the application processor 104, the ASIC 107, the first front-end image capturing device 109*a* and the second front-end image capturing device 109*b*.

The first half reflective film 103a and the second half reflective film 103b can cover the first lens 102a and the second lens 102b in different ways. For example, the first half reflective film 103a is pasted on the first lens 102a, and the second half reflective film 103b is pasted on the second lens 102b. Or, the first half reflective film 103a is coated on the first lens 102a to form a coated lens, and the second half reflective film 103b is coated on the second lens 102b to form another coated lens. In the HMD apparatus 1, the beam splitter used in a conventional HMD apparatus is replaced by the first half reflective film 103a and the second half reflective film 103b. Thus, the volume of the HMD apparatus 1 can be further reduced. For the convenience of description, in the first embodiment, two pico projectors and two half reflective films are used as an exemplification, but the implementations of the present embodiment are not limited thereto, In some embodiments, the HMD apparatus can use only one pico projector and one half reflective film instead of two pico projectors and two half reflective films.

Second Embodiment

Figure 4:
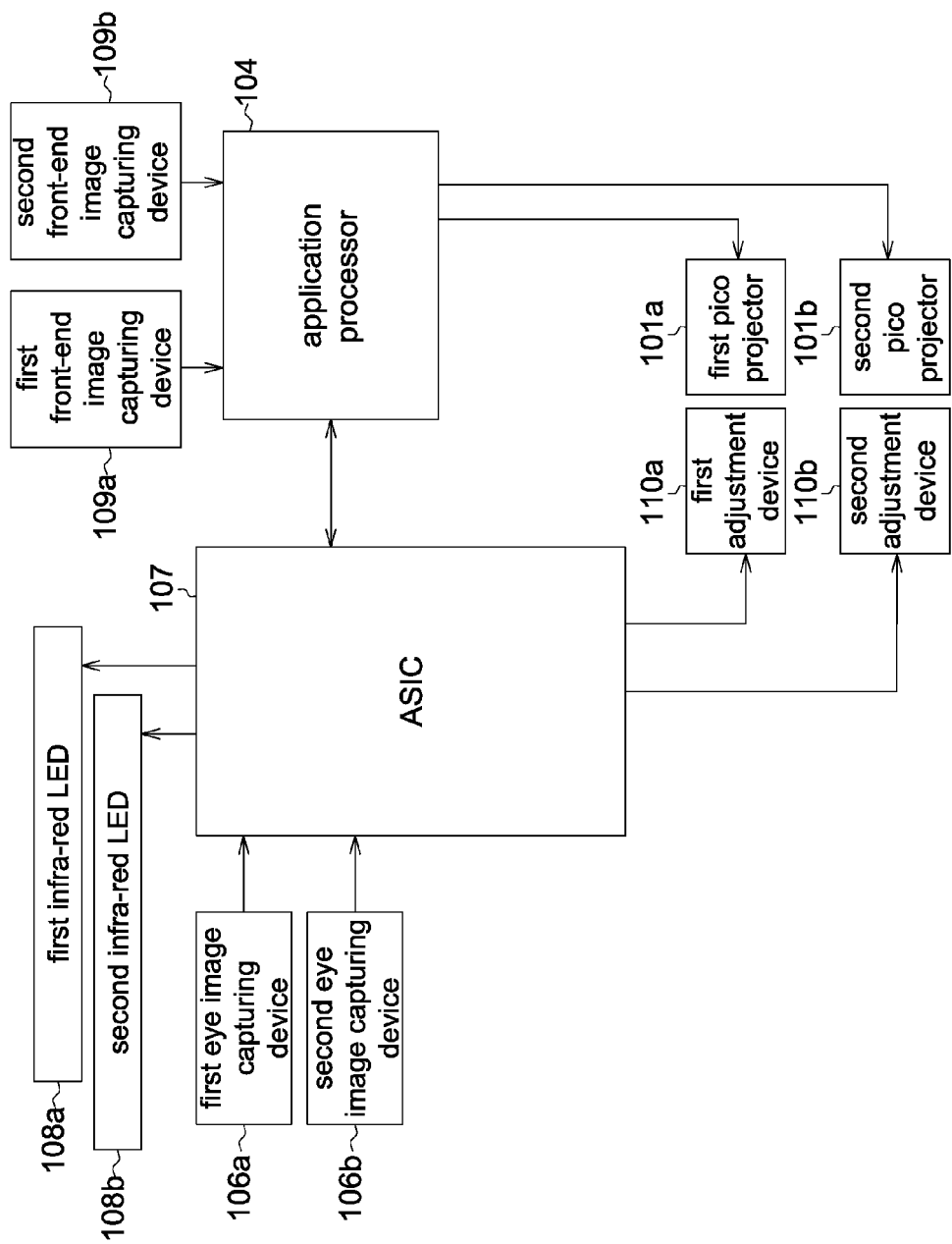
FIG. 4 is a block diagram of an HMD apparatus according to a second embodiment.
Figure 5:
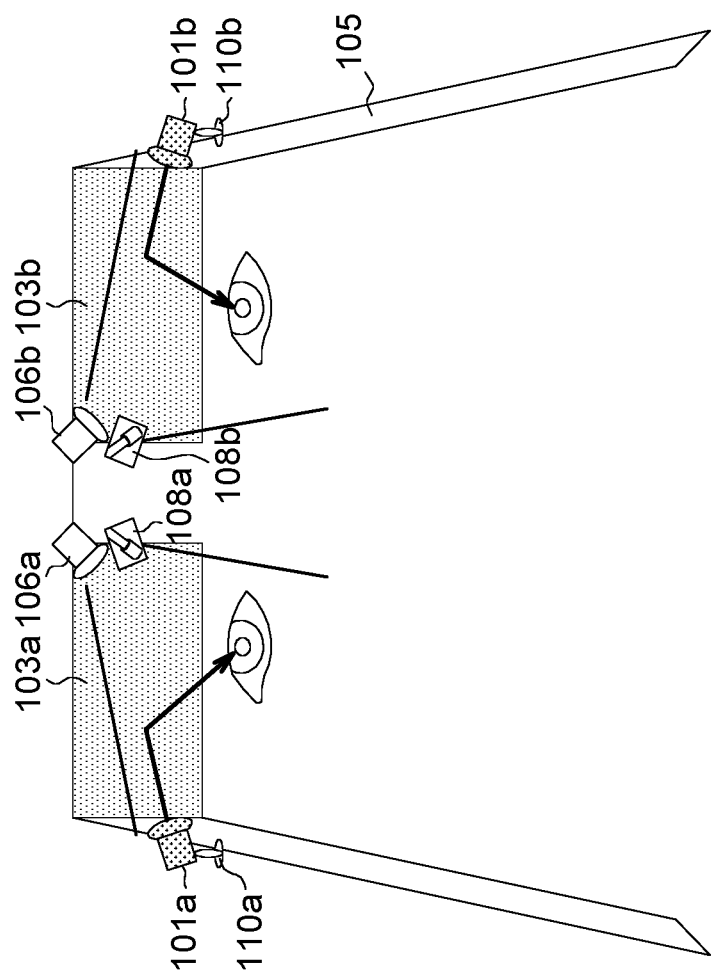
FIG. 5 is an appearance diagram of an HMD apparatus according to a second embodiment.

Refer to FIG. 4 and FIG. 5. FIG. 4 is a block diagram of an HMD apparatus according to a second embodiment.

FIG. 5 is an appearance diagram of an HMD apparatus according to a second embodiment. The second embodiment is different from the first embodiment mainly in that the HMD apparatus 2 further comprises a first eye image capturing device 106a, a second eye image capturing device 106b, a first infra-red LED 108a, a second infra-red LED 108b, a first adjustment device 110a, and a second adjustment device 110b.

The eyeglass frame 105 further carries the first eye image capturing device 106a, the second eye image capturing device 106b, the first infra-red LED 108a, the second infra-red LED 108b, the first adjustment device 110a, and the second adjustment device 110b. In the second embodiment, both the first adjustment device 110a and the second adjustment device 110b are exemplified by a motor-driven actuator, which comprises a stepper motor, a corresponding gear set and mechanical member, and a motor driver IC. The first adjustment device 110a and the second adjustment device 110b can horizontally or vertically move the first pico projector 101a and the second pico projector 101b.

The first eye image capturing device 106a and the second eye image capturing device 106b are connected to the ASIC 107, and communicate with the ASIC 107 through a parallel I/F or a mobile industry processor interface (MIPI). The first infra-red LED 108a and the second infra-red LED 108b are connected to the ASIC 107, and communicate with the ASIC 107 through a general purpose input output (GPIO). The first infra-red LED 108a is controlled by the ASIC 107 to provide a first auxiliary light source required by the first eye image capturing device 106a. The second infra-red LED 108b is controlled by the ASIC 107 to provide a second auxiliary light source required by the second eye image capturing device 106b.

The ASIC 107 obtains a first pupil position according to the first eye image, and controls the first adjustment device 110a to adjust the first virtual image beam according to the first pupil position, so that the first virtual image beam is reflected to the first pupil position by the first half reflective film 103a. The ASIC 107 obtains a second pupil position according to the second eye image, and controls the second adjustment device 110b to adjust the second virtual image beam according to the second pupil position, so that the second virtual image beam is reflected to the second pupil position by the second half reflective film 103b. Through the above automatic pupil tracking mechanism, exit pupil diameter of the first pico projector 101a and the second pico projector 101b can be further reduced to avoid remaining beams being wasted on other reflective positions so as to increase brightness or save power consumption of a backlight module.

Figure 6:
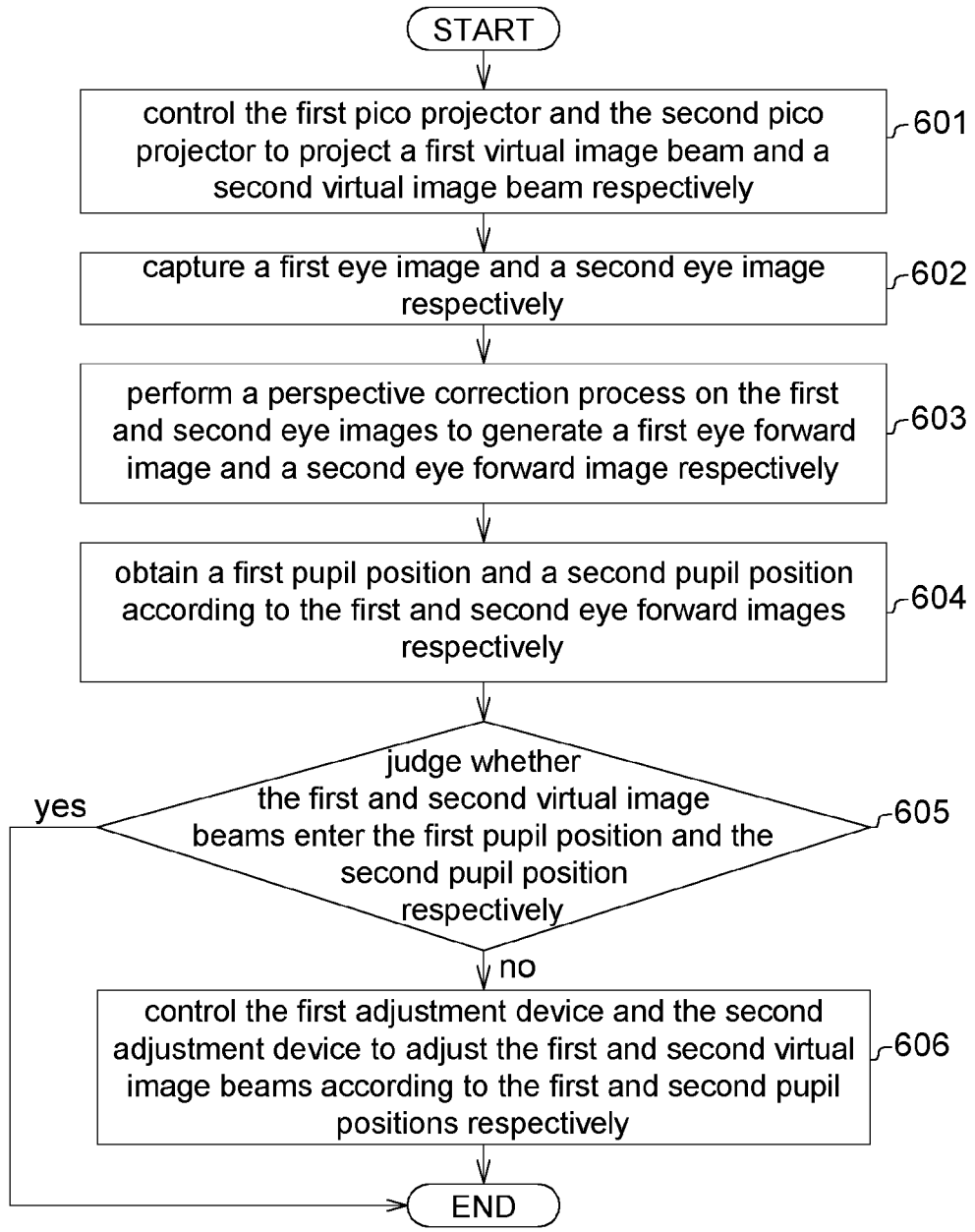
FIG. 6 is a flowchart of an automatic pupil tracking method according to a second embodiment.

Refer to FIG. 4, FIG. 5 and FIG. 6 at the same time. FIG. 6 is a flowchart of an automatic pupil tracking method according to a second embodiment. The automatic pupil tracking method used in the HMD apparatus 2 comprises following steps. Firstly, the method begins at step 601, the application processor 104 controls the first pico projector 101a and the second pico projector 101b to project a first virtual image beam and a second virtual image beam, respectively. Then, the method proceeds to step 602, the first eye image capturing device 106a and the second eye image capturing device 106b capture a first eye image and a second eye image, respectively. Then, the method proceeds to step 603, the ASIC 107 performs a perspective correction process on the first and second eye images, such as images viewed by a user's two eyes, to generate a first eye forward image and a second eye forward image, respectively. Then, the method proceeds to step 604, the ASIC 107 obtains a first pupil position and a second pupil position according to the first and second eye forward images, respectively. In some embodiments, before the first and second pupil positions are obtained by the ASIC 107, an eyeball detection process can be performed to void capturing an image with blinking eyes which will lead to erroneous judgment in subsequent analysis.

Then, the method proceeds to step 605, the ASIC 107 judges whether the first and second virtual image beams enter the first pupil position and the second pupil position, respectively. If no, then the method proceeds to step 606. In step 606, the ASIC 107 controls the first adjustment device 110a and the second adjustment device 110b to adjust the first and second virtual image beams according to the first and second pupil positions until the first and second virtual image beams enter the first and second pupil positions, respectively. Since the positions of the first and second virtual image beams can be dynamically adjusted according to the first and second pupil positions, the user does not need to adjust the viewing direction and will find the operation become more convenient.

In addition, the application processor 104 can further assist the first front-end image sensor 109a and the second front-end image sensor 109b with the calculation of auto exposure according to the first and second pupil positions, respectively. Moreover, the application processor 104 can further adjust the first and second image data corresponding to the first and second virtual image beams according to the first and second pupil positions, respectively. For example, the application processor 104 performs view synthesis and compensation on the first and second image data according to the first and second pupil positions, respectively.

The way by which the HMD apparatus controls the first adjustment device 110a or the second adjustment device 110b is not limited to the automatic pupil tracking mechanism disclosed above. In some embodiments, the HMD apparatus can comprise a human machine interface, which controls the first adjustment device 110a or the second adjustment device 110b according to a user command, such as voice or a hand gesture. The user can control the first adjustment device 110a or the second adjustment device 110b to adjust the first virtual image beam or the second virtual image beam.

Figure 7:
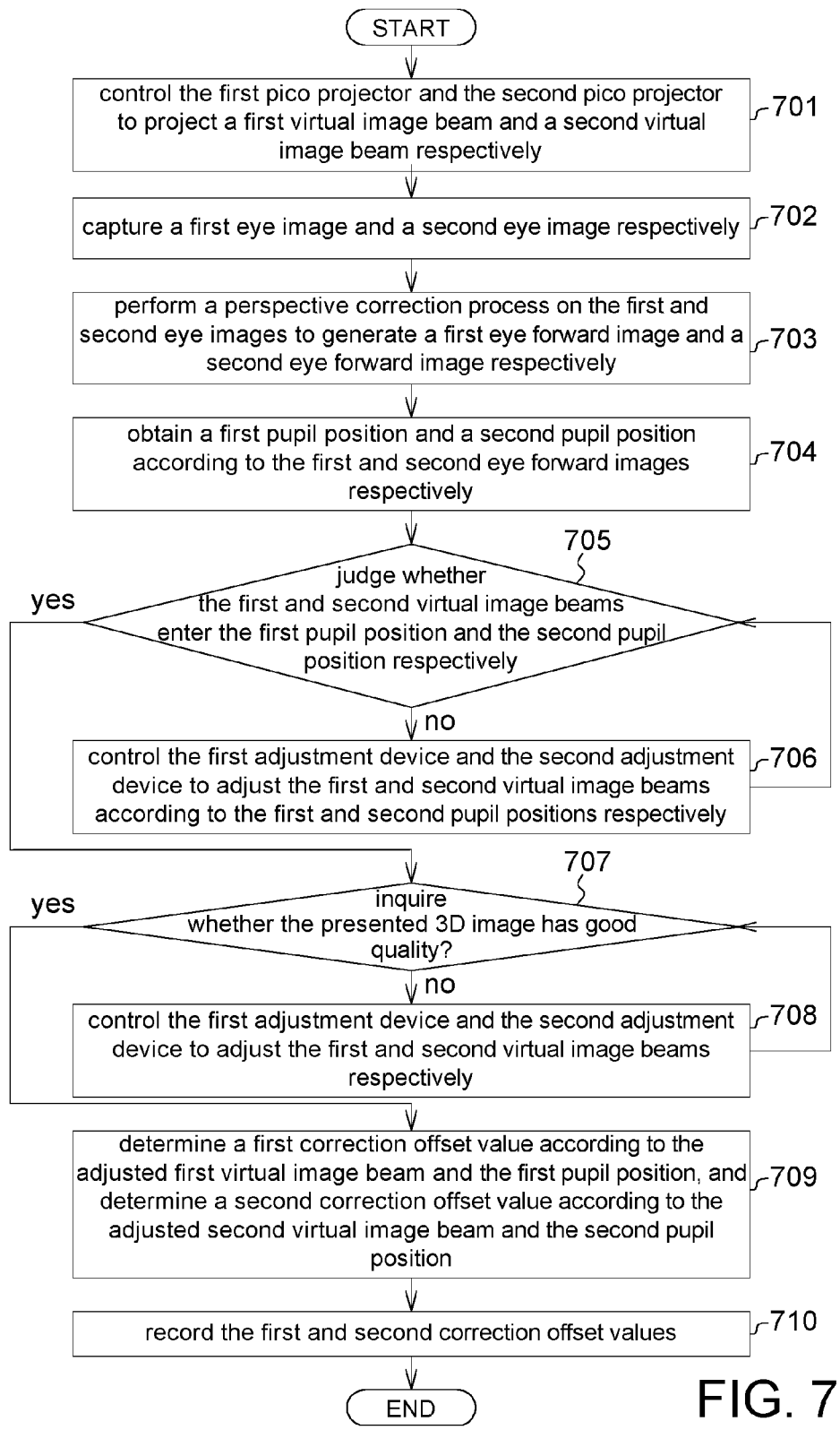
FIG. 7 is a flowchart of an initial 3D correction method according to a second embodiment.

Refer to FIG. 4, FIG. 5 and FIG. 7 at the same time. FIG. 7 is a flowchart of an initial 3D correction method according to a second embodiment. The initial 3D correction method used in the HMD apparatus 2 comprises following steps. Firstly, the method begins at step 701, the application processor 104 controls the first pico projector 101a and the second pico projector 101b to project a first virtual image beam and a second virtual image beam according to a 3D correction data, respectively. Next, the method proceeds to step 702, the first eye image capturing device 106a and the second eye image capturing device 106b capture a first eye image and a second eye image, respectively. Then, the method proceeds to step 703, the ASIC 107 performs a perspective correction process on the first and second eye images, such as images viewed by a user's two eyes, generate a first eye forward image and a second eye forward image, respectively. Then, the method proceeds to step 704, the ASIC 107 obtains a first pupil position and a second pupil position according to the first and second eye forward images, respectively. In some embodiments, before the first and second pupil positions are obtained by the ASIC 107, an eyeball detection process can be performed to void capturing an image with blinking eyes which will lead to erroneous judgment in subsequent analysis.

Then, the method proceeds to step 705, the ASIC 107 judges whether the first and second virtual image beams enter the first and second pupil positions, respectively. If no, then the method proceeds to step 706. In step 706, the ASIC 107 controls the first adjustment device 110a and the second adjustment device 110b to adjust the first and second virtual image beams according to the first and second pupil positions until the first and second virtual image beams enter the first and second pupil positions, respectively. If so, then the method proceeds to step 707. In step 707, the application processor 104 sends an inquiry message to inquire whether the presented 3D image has good quality.

If the presented 3D image does not have good quality, then the method proceeds to step 708. In step 708, the ASIC 107 controls the first adjustment device 110a and the second adjustment device 110b to adjust the first and second virtual image beams respectively until the presented 3D image has good quality. In step 709, the ASIC 107 determines a first correction offset value according to the adjusted first virtual image beam and the first pupil position, and determines a second correction offset value according to the adjusted second virtual image beam and the second pupil position. Then, the method proceeds to step 710, the application processor records the first correction offset value and the second correction offset value. The first correction offset value further comprises a horizontal offset value and a vertical offset value, and the second correction offset value also comprises a horizontal offset value and a vertical offset value.

Figure 8B:
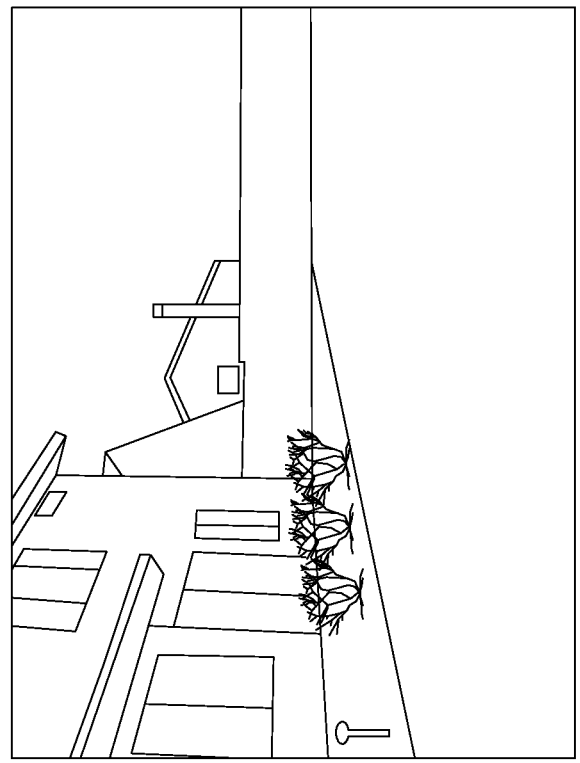
FIGS. 8A ~8B are schematic diagrams of a first 3D correction pattern.
Figure 8A:
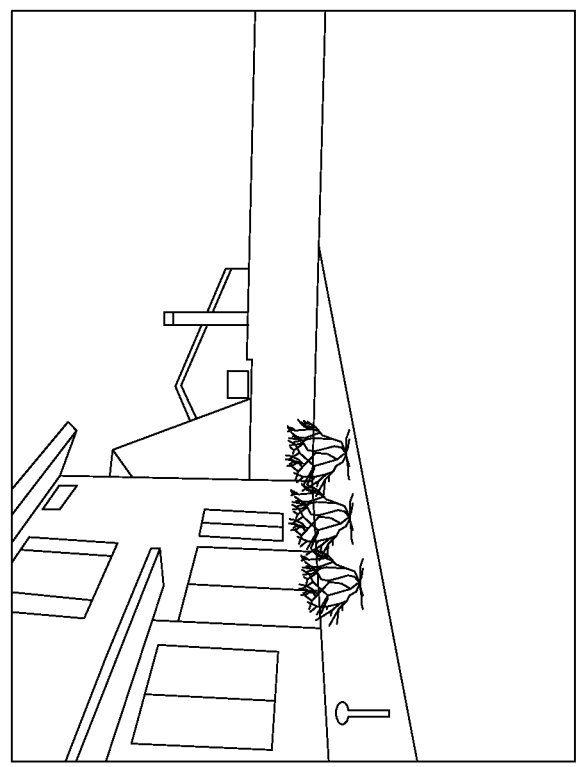
Figure 9B:
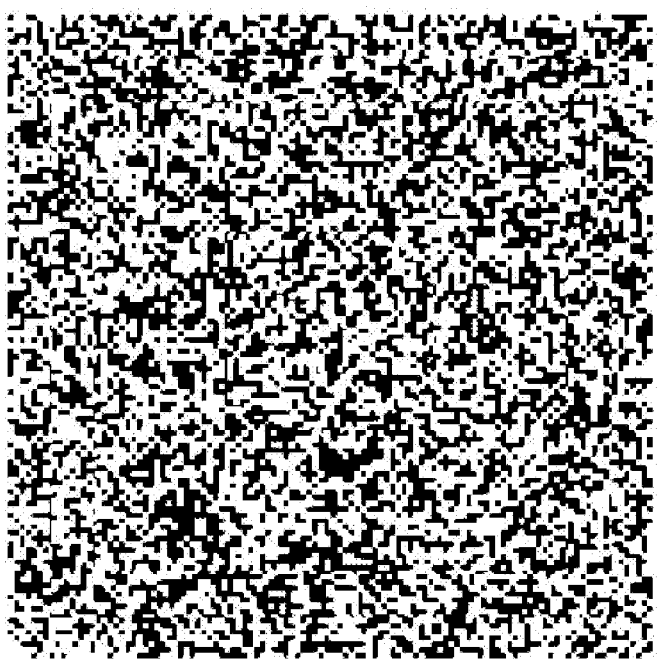
FIGS. 9A ~9B are diagram of a second 3D correction pattern schematic.
Figure 9A:
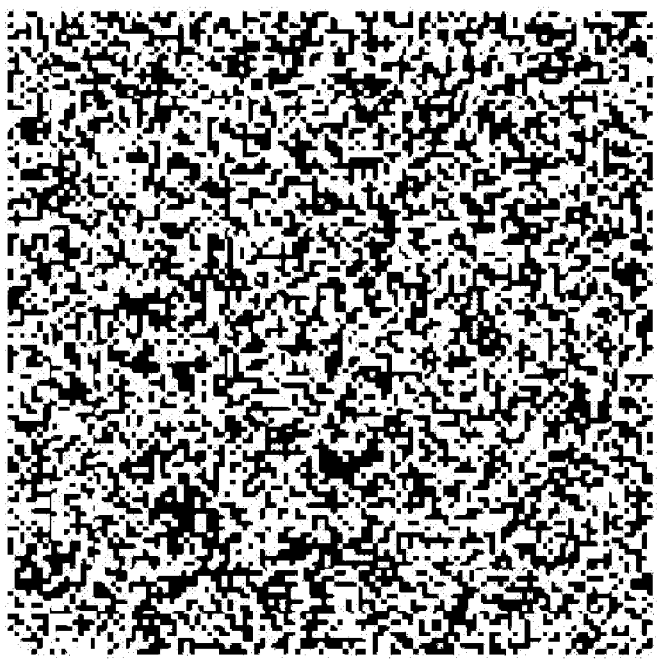

Refer to FIG. 4, FIGS. 8A ~8B, FIGS. 9A ~9B, FIGS. 10A ~10E and FIGS. 11A ~11E at the same time. FIGS. 8A ~8B are schematic diagrams of a first 3D correction pattern. FIGS. 9A ~9B are schematic diagrams of a second 3D correction pattern. FIGS. 10A ~10B and 11A ~11B are schematic diagrams of a third 3D correction pattern. FIGS. 10C ~10E and 11C ~11E are schematic diagrams of results of the third 3D correction pattern viewed by a user. The said a 3D correction data is selected from a group composed of a first 3D correction pattern, a second 3D correction pattern and a third 3D correction pattern. In the present embodiment, the 3D correction data exemplarily comprises the first 3D correction pattern, the second 3D correction pattern and the third 3D correction pattern. As indicated in FIGS. 8A ~8B, the first 3D correction pattern comprises both monocular depth cue and binocular disparity. As indicated in FIGS. 9A ~9B, the second 3D correction pattern comprises binocular disparity but does not comprise monocular depth cue. As indicated in FIGS. 10A ~10B and 11A ~11B, the third 3D correction pattern does not comprise monocular depth cue nor comprises binocular disparity.

In a human's visual system, there are many cues for sensing depth information. Examples of the cues are such as binocular disparity, dynamic parallax, linear perspective, and so on. The physiological/psychological factors other than binocular disparity are referred as monocular depth cues. Let the linear perspective be taken for example. The vanishing point has the deepest depth, and the depths form a gradient change. During the first 3D correction process, the application processor 104 can perform 3D correction according to the first 3D correction patterns of FIGS. 8A ~8B. During the second 3D correction process, the application processor 104 can perform 3D correction according to the second 3D correction patterns of FIGS. 9A-9B. Since the second 3D correction patterns do not comprise any monocular depth cues, the brain does not have any monocular depth cues that can be used for self-compensation. Therefore, the HMD apparatus 2 can perform correction with greater accuracy.

Figure 10C:
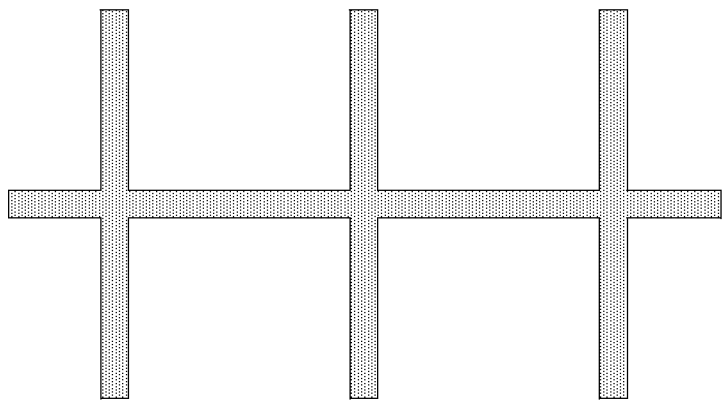
Figure 10B:
FIGS. 10A ~10B and FIGS. 11A ~11B are schematic diagrams of a third 3D correction pattern.
Figure 10A:
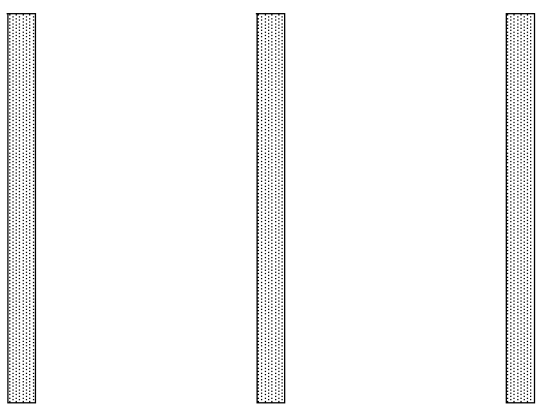

During the third 3D correction process, the application processor 104 can perform 3D correction according to the third 3D correction patterns of FIGS. 10A ~10B and 11A ~11B. The third 3D correction patterns of FIGS. 10A-10B are used for correcting the horizontal portion of the 3D display engine, and the application processor 104 can obtain a horizontal offset value according to FIGS. 10A ~10B.

In theory, after the HMD apparatus 2 corrected the horizontal portion of the 3D display engine, what the user viewed should be the image as indicated in FIG. 10C. The application processor 104 can inquire the user whether the image is as illustrated in FIG. 10C. If so, this indicates that the correction process performed on the horizontal portion of the 3D display engine is completed. If no, this indicates that the correction performed on the horizontal portion of the 3D display engine is not completed yet, and what the user viewed could be the image as indicated in FIG. 10D or 10E. The ASIC 107 controls the first adjustment device 110a and the second adjustment device to adjust the first and second virtual image beams until the image viewed by the user is as indicated in FIG. 10C.

Figure 11A:
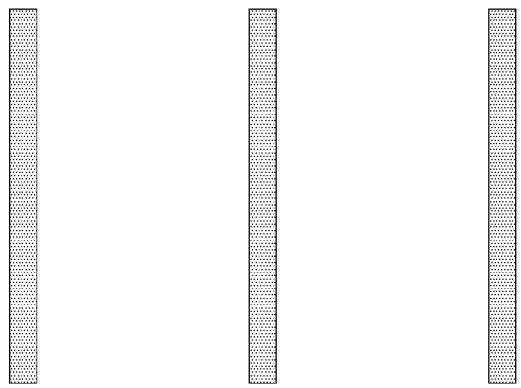
Figure 11B:
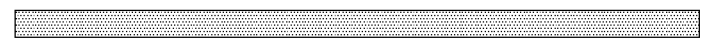
Figure 11C:
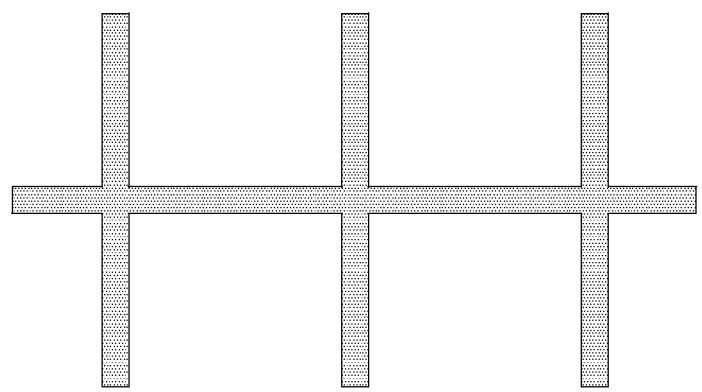
Figure 11D:
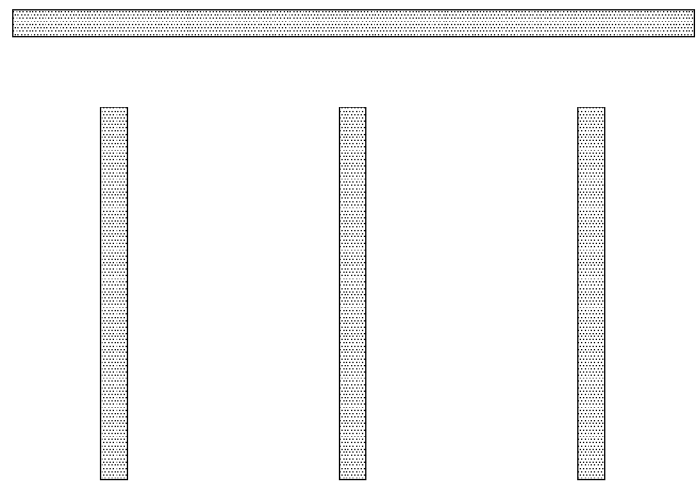
Figure 11E:
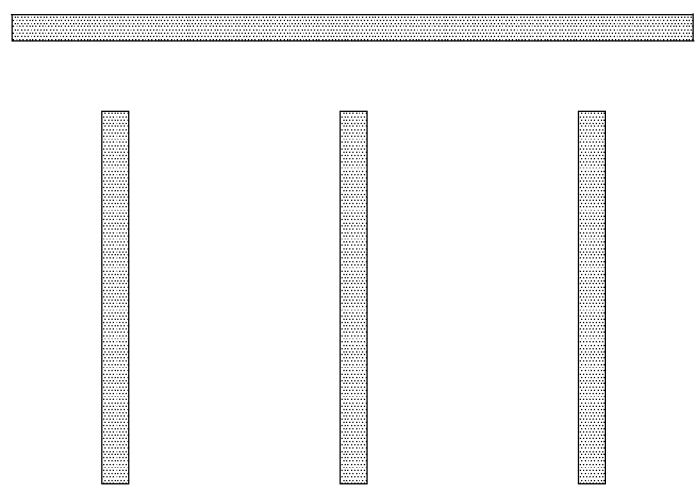

Likewise, in theory, after the HMD apparatus 2 corrected the vertical portion of the 3D display engine, what the user viewed should be the image as indicated in FIG. 11C. The application processor 104 can inquire the user whether the image is as illustrated in FIG. 11C. If so, this indicates that the correction process performed on the vertical portion of the 3D display engine is completed. If no, this indicates that the correction process performed on the vertical portion of the 3D display engine is not completed yet, and what the user viewed could be the image as indicated in FIG. 11D or 11E. The ASIC 107 controls the first adjustment device 110a and the second adjustment device 110b to adjust the first and second virtual image beams respectively until the image viewed by the user is as indicated in FIG. 11C.

Third Embodiment

Figure 12:
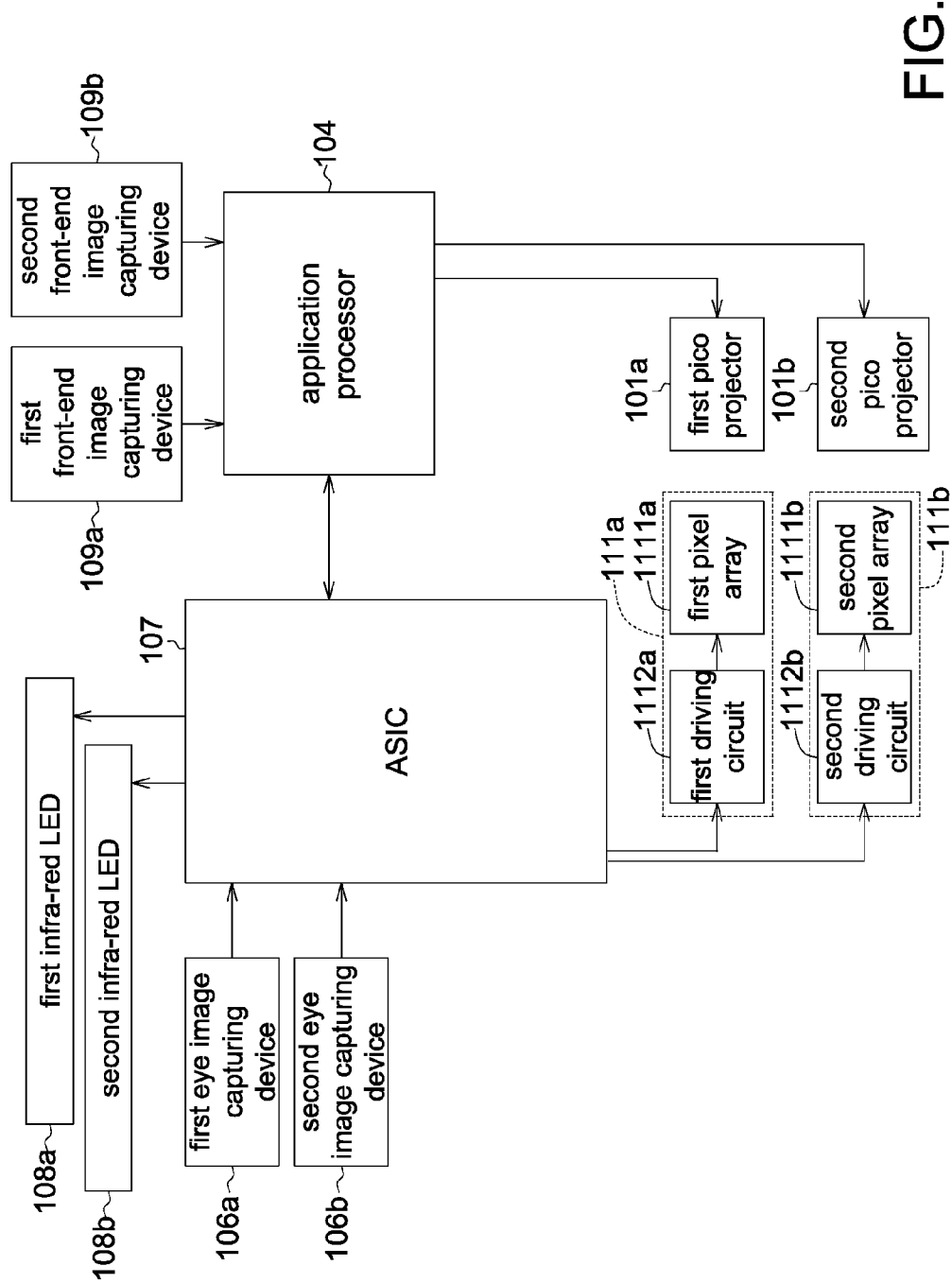
FIG. 12 is a block diagram of an HMD apparatus according to a second embodiment.
Figure 13:
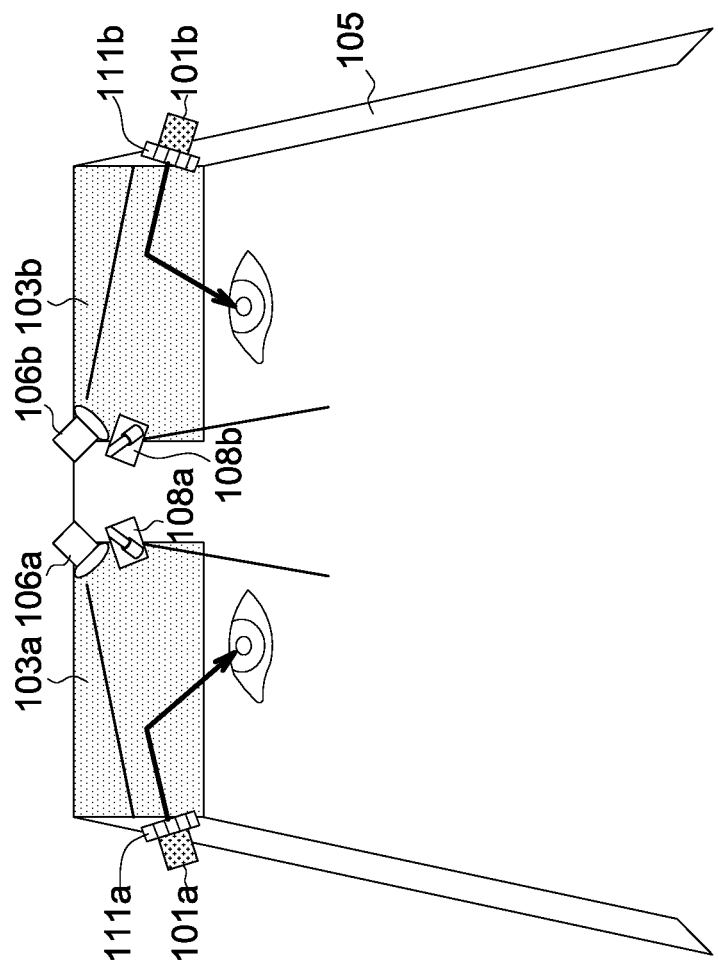
FIG. 13 is an appearance diagram of an HMD apparatus according to a second embodiment.
Figure 14A:
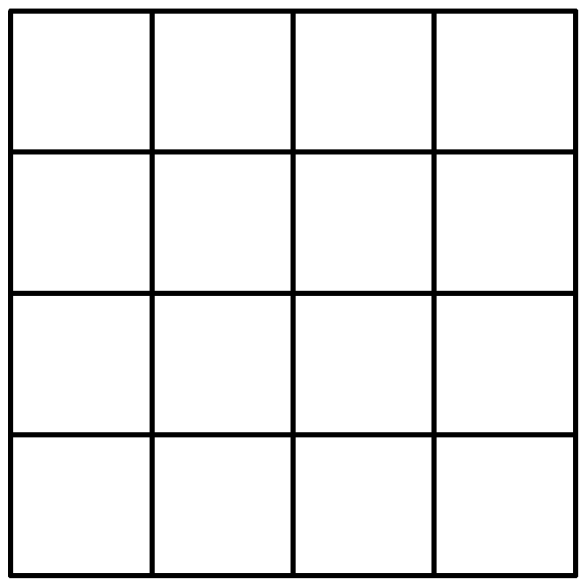
FIGS. 14A ~14D respectively are schematic diagrams of a pixel array according to a third embodiment.
Figure 14B:
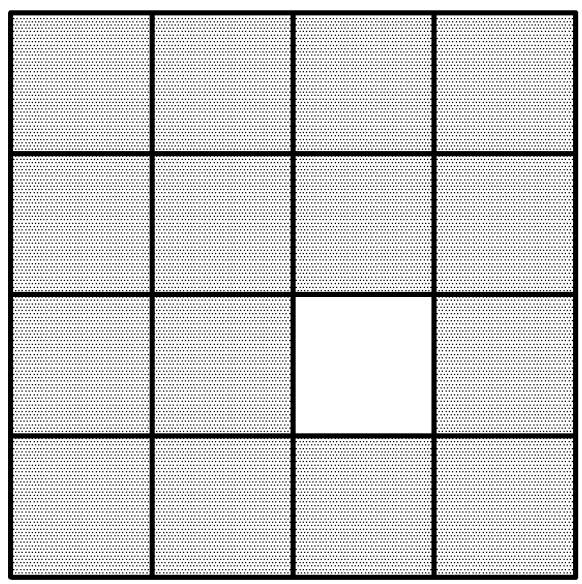
Figure 14C:
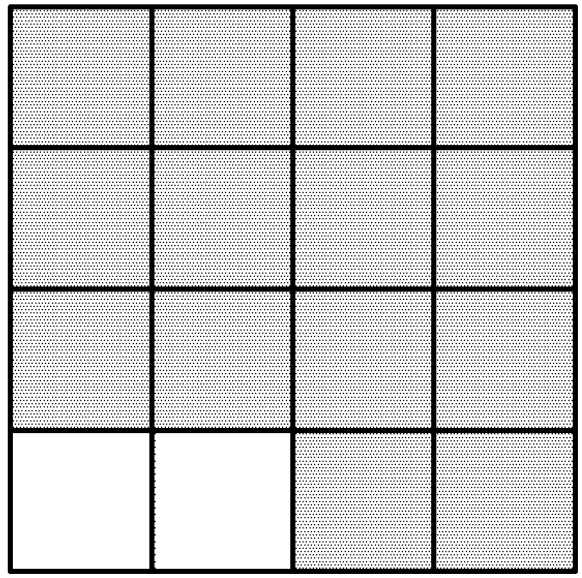
Figure 14D:
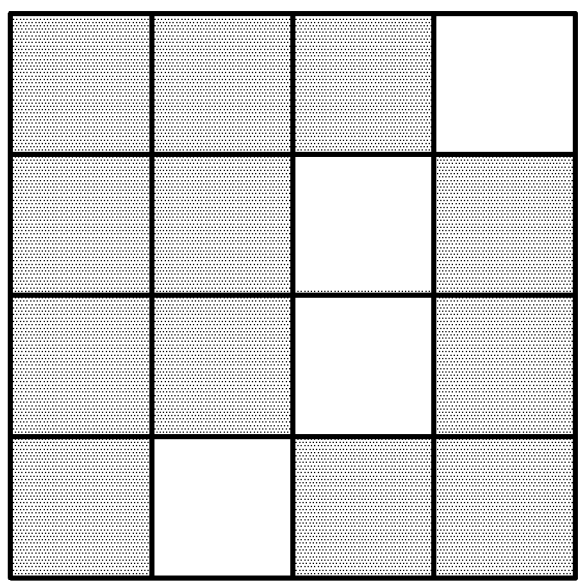

Refer to FIG. 12 and FIG. 13 at the same time. FIG. 12 is a block diagram of an HMD apparatus according to a second embodiment. FIG. 13 is an appearance diagram of an HMD apparatus according to a second embodiment. The third embodiment is different from the second embodiment mainly in that the first adjustment device 111a and the second adjustment device 111b of the HMD apparatus 3 both are exemplified by a liquid crystal panel, and the first adjustment device 111a and the second adjustment device 111b are disposed in front of the lens of the first pico projector 101a and the lens of the second pico projector 101b, respectively. The first adjustment device 111a comprises a first pixel array 1111a and a first driving circuit 1112a. The second adjustment device 111b comprises a second pixel array 1111b and a second driving circuit 1112b. The ASIC 107 controls the first driving circuit 1112a and the second driving circuit 1112b to drive the first pixel array 1111a and the second pixel array 1111b to adjust the first and second virtual image beams, respectively. By turning on/off the pixels at different positions of the first pixel array 1111a and the second pixel array 1111b, the HMD apparatus 3 can have the same function as to enable the motor-driven actuator to horizontally or vertically move the first pico projector 101a and the second pico projector 101b.

Refer to FIG. 12 and FIGS. 14A ~14D at the same time. FIGS. 14A-14D respectively are schematic diagrams of a pixel array according to a third embodiment. The first pixel array 1111a and the second pixel array 1111b are such as the pixel arrays of FIGS. 14A ~14D. The pixel array of FIG. 14A indicates that all pixels are turned on. The pixel array of FIGS. 14B ~14C indicates that only a portion of the pixels is turned on. By turning on/off the pixels, the HMD apparatus 3 can adjust the positions of the first and second virtual image beams.

According to the HMD apparatus disclosed in above embodiments, beam splitters of a conventional HMD apparatus are replaced by half reflective films, so that volume of the HMD apparatus can be further reduced. In addition, the HMD apparatus with automatic pupil tracking function can increase the viewing angle of a virtual image without restricting the user's eyeball positions when the user is viewing the virtual image. Furthermore, the HMD apparatus with automatic pupil tracking function can further reduce exit pupil diameters of pico projectors to avoid remaining beams being wasted on other reflective positions so as to increase brightness or save power consumption of a backlight module.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A head mounted display (HMD) apparatus, comprising:
    a first pico projector;
    a first lens;
    a first half reflective film covering the first lens;
    an application processor for controlling the first pico projector to project a first virtual image beam to the first half reflective film; and
    an eyeglass frame for carrying the first pico projector, the first lens and the application processor;
    wherein the application processor controls the first pico projector to project the first virtual image beam according to 3D correction data, and the 3D correction data is selected from a group composed of a first 3D correction pattern, a second 3D correction pattern and a third 3D correction pattern.

2. The HMD apparatus according to claim 1, further comprising:
    a first eye image capturing device for capturing a first eye image;
    a first adjustment device;
    an application specific integrated circuit (ASIC) for obtaining a first pupil position according to the first eye image, and further controlling the first adjustment device to adjust the first virtual image beam according to the first pupil position, so that the first virtual image beam is reflected to the first pupil position by the first half reflective film.

3. The HMD apparatus according to claim 2, wherein the ASIC performs a perspective correction process on the first eye image to generate a first eye forward image, obtains the first pupil position according to the first eye image, and judges whether the first virtual image beam enters the first pupil position: if the first virtual image beam does not enter the first pupil position, then the ASIC controls the first adjustment device to adjust the first virtual image beam.

4. The HMD apparatus according to claim 3, further comprising:
    a second pico projector;
    a second lens;
    a second half reflective film covering the second lens;
    a second eye image capturing device for capturing a second eye image;
    a second adjustment device;
    wherein, the application processor controls the second pico projector to project a second virtual image beam to the second half reflective film, and the ASIC obtains a second pupil position according to the second eye image, and controls the second adjustment device to adjust the second virtual image beam according to the second pupil position, so that the second virtual image beam is reflected to the second pupil position by the second half reflective film.

5. The HMD apparatus according to claim 4, wherein the ASIC performs a perspective correction process on the second eye image to generate a second eye forward image, obtains the second pupil position according to the second eye image, and judges whether the second virtual image beam enters the second pupil position: if the second virtual image beam does not enter the second pupil position, then the ASIC controls the second adjustment device to adjust the second virtual image beam.

6. The HMD apparatus according to claim 5, wherein the application processor controls the first pico projector and the second pico projector to project the first virtual image beam and the second virtual image beam according to the 3D correction data, respectively, and when the first virtual image beam enters the first pupil position and the second virtual image beam enters the second pupil position, the application processor sends an inquiry message to inquire whether a presented 3D image has good quality: if the presented 3D image does not have good quality, then the ASIC controls the first and second adjustment devices to adjust the first and second virtual image beams, respectively, determines a first correction offset value according to the adjusted first virtual image beam and the first pupil position, determines a second correction offset value according to the adjusted second virtual image beam and the second pupil position, and records the first correction offset value and the second correction offset value.

7. The HMD apparatus according to claim 6, wherein the first 3D correction pattern comprises a monocular depth cue and a binocular disparity, the second 3D correction pattern comprises the binocular disparity but does not comprise the monocular depth cue, and the third 3D correction pattern does not comprise the monocular depth cue or the binocular disparity.

8. The HMD apparatus according to claim 4, wherein the first half reflective film is coated on the first lens, and the second half reflective film is coated on the second lens.

9. The HMD apparatus according to claim 4, wherein the first half reflective film is pasted on the first lens, and the second half reflective film is pasted on the second lens.

10. The HMD apparatus according to claim 4, wherein the first adjustment device and the second adjustment device both are a motor-driven actuator.

11. The HMD apparatus according to claim 4, wherein the first adjustment device and the second adjustment device both are a liquid crystal panel.

12. The HMD apparatus according to claim 1, wherein the first half reflective film is coated on the first lens.

13. The HMD apparatus according to claim 1, wherein the first half reflective film is pasted on the first lens.

14. The HMD apparatus according to claim 2, wherein the first adjustment device is a motor-driven actuator.

15. The HMD apparatus according to claim 2, wherein the first adjustment device is a liquid crystal panel.

16. The HMD apparatus according to claim 1, further comprising:
  a second pico projector;
  a second lens;
  a second half reflective film covering the second lens, wherein the eyeglass frame further carries the second pico projector and the second lens, and the application processor controls the second pico projector to project a second virtual image beam to the second half reflective film.

17. The HMD apparatus according to claim 16, wherein the first half reflective film is coated on the first lens, and the second half reflective film is coated on the second lens.

18. The HMD apparatus according to claim 16, wherein the first half reflective film is pasted on the first lens, and the second half reflective film is pasted on the second lens.

19. The HMD apparatus according to claim 16, further comprising:
  a first adjustment device for adjusting the first virtual image beam;
  a second adjustment device for adjusting the second virtual image beam; and
  a human machine interface for controlling the first adjustment device and the second adjustment device according to a user command.

20. The HMD apparatus according to claim 1, further comprising:
  a first adjustment device for adjusting the first virtual image beam.

21. The HMD apparatus according to claim 20, wherein the first adjustment device is a motor-driven actuator.

22. The HMD apparatus according to claim 20, wherein the first adjustment device is a liquid crystal panel.

23. The HMD apparatus according to claim 20, wherein the first half reflective film is coated on the first lens.

24. The HMD apparatus according to claim 20, wherein the first half reflective film is pasted on the first lens.

25. The HMD apparatus according to claim 20, further comprising:
  a human machine interface for controlling the first adjustment device according to a user command.

\* \* \* \* \*